US012656656B2

(12) United States Patent
Go et al.

(10) Patent No.: US 12,656,656 B2
(45) Date of Patent: Jun. 16, 2026

(54) ACTUATOR FOR CAMERA

(71) Applicant: JAHWA electronics Co., Ltd.,
Chungcheongbuk-do (KR)

(72) Inventors: Jae Yong Go, Seoul (KR); Kyoung Yong Lee, Chungcheongbuk-do (KR)

(73) Assignee: JAHWA electronics Co., Ltd.,
Chungcheongbuk-do (KR)

( * ) Notice: Subject to any disclaimer, the term of this patent is extended or adjusted under 35 U.S.C. 154(b) by 289 days.

(21) Appl. No.: 18/566,857

(22) PCT Filed: Jun. 23, 2022

(86) PCT No.: PCT/KR2022/008937
§ 371 (c)(1),
(2) Date: Dec. 4, 2023

(87) PCT Pub. No.: WO2023/027313
PCT Pub. Date: Mar. 2, 2023

(65) Prior Publication Data
US 2024/0272519 A1 Aug. 15, 2024

(30) Foreign Application Priority Data
Aug. 25, 2021 (KR) ........................ 10-2021-0112068

(51) Int. Cl.
*G03B 3/10* (2021.01)
*G03B 13/36* (2021.01)
(52) U.S. Cl.
CPC .............. *G03B 3/10* (2013.01); *G03B 13/36* (2013.01)
(58) Field of Classification Search
CPC . G03B 3/10; G03B 13/36; G03B 5/00; G03B 5/04; G03B 17/12;
(Continued)

(56) References Cited

U.S. PATENT DOCUMENTS

2009/0195878 A1 8/2009 Kurosawa
2013/0163085 A1* 6/2013 Lim ........................ G03B 5/00
359/557
(Continued)

FOREIGN PATENT DOCUMENTS

KR 10-1343197 B1 12/2013
KR 10-2016-0022656 A 3/2016
(Continued)

OTHER PUBLICATIONS

International Search Report for PCT/KR2022/008937 mailed on Oct. 6, 2022.
(Continued)

*Primary Examiner* — Bumsuk Won
*Assistant Examiner* — John Curtis Sipes
(74) *Attorney, Agent, or Firm* — The PL Law Group, PLLC

(57) ABSTRACT

An actuator for cameras includes a carrier having a lens attached thereto and movable along an optical axis, a housing enclosing the carrier, at least one magnet mounted on the carrier and having k magnetic poles where k is a natural number equal to or larger than one, coils facing the magnet and disposed anterior or posterior along the optical axis, a Hall sensor assembly having m Hall sensors where m is a natural number equal to or larger than three, disposed along the optical axis, each of the m Hall sensors separated from one another by a first spacing, and an operational driver controlling the current applied to the coils in response to the signals from the Hall sensor assembly, in which the length of the magnetic pole is not less than the first spacing but not more than twice the first spacing.

4 Claims, 6 Drawing Sheets

(58) Field of Classification Search
CPC .... G03B 2205/0015; G03B 2205/0084; H02K 11/215; H02K 33/18; H02K 2211/03; H04N 23/54
See application file for complete search history.

(56) References Cited

U.S. PATENT DOCUMENTS

| | | | | |
|---|---|---|---|---|
| 2016/0342069 A1* | 11/2016 | Inoue | H02K 41/0356 |
| 2020/0271892 A1* | 8/2020 | Hu | H02K 41/0354 |
| 2020/0351421 A1* | 11/2020 | Park | H04N 23/51 |
| 2021/0063680 A1* | 3/2021 | Kim | G03B 13/36 |
| 2022/0099917 A1* | 3/2022 | Seo | G02B 27/646 |
| 2022/0368814 A1* | 11/2022 | Topliss | G02B 27/646 |
| 2023/0209162 A1* | 6/2023 | Kim | H04N 23/55 348/207.99 |
| 2023/0296962 A1* | 9/2023 | Lee | H04N 23/51 359/557 |
| 2024/0388783 A1* | 11/2024 | Kim | G03B 17/12 |

FOREIGN PATENT DOCUMENTS

| | | |
|---|---|---|
| KR | 10-2016-0023386 A | 3/2016 |
| KR | 10-2020-0126871 A | 11/2020 |
| KR | 10-2021-0030724 A | 3/2021 |

OTHER PUBLICATIONS

Office action issued on Mar. 13, 2025 from Korean Patent Office in a counterpart Korean Patent Application No. 10-2021-0112068 (all the cited references are listed in this IDS.) (English translation is also submitted herewith.).

* cited by examiner

FIG. 5

ACTUATOR FOR CAMERA

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2022/008937, filed Jun. 23, 2022, which claims priority to the benefit of Korean Patent Application No. 10-2021-0112068 filed on Aug. 25, 2021, in the Korean Intellectual Property Office, the entire contents of which are incorporated herein by reference.

BACKGROUND

1. Technical Field

The present disclosure relates to an actuator for cameras. More particularly, the present disclosure relates to an actuator for cameras capable of reliably enhancing driving performance and spatial efficiency.

2. Background Art

Advances in hardware technology for image processing and growing consumer need for making and taking photos and videos have driven implementation of such functions as autofocusing (AF) and optical image stabilization (OIS) in stand-alone cameras as well as camera modules mounted on mobile terminals including cellular phones and smartphones.

Furthermore, recent years have seen actuators for zoom lens that supports variable adjustment features including the object size by tuning the focal length through such functions as zoom-in and zoom-out. In certain models of actuators, further diversification in implementing zoom has been attainable through combinations in the positional relationship among plural lenses (lens assembly).

These actuators for zoom lenses have distances of movement along the optical axis (also referred to as stroke) that are extended or expanded than those of ordinary lenses, and thus their design should guarantee commensurate increase in driving force and enable accurate detection and feedback control of zoom lens positions across the entire stroke range.

In this regard, for the purpose of augmenting the driving force, art-known actuators or devices have approached using means such as combinations of magnets and coils in which magnets wider areas face the coils with more winding wires and arrays of plural coils along the optical axis.

As methods for accurate detection, the same Hall sensors as generally used for camera actuators, have been re-applied in zoom lens actuators albeit with some change such as increase in their numbers to accommodate the extended or expanded distances.

Art-known actuators, however, suffered from the inflated sizes and weight of the carriers holding the magnet, as the requisite magnets had to have areas wide enough to face most of the plural Hall sensors installed in order to detect the lens position.

Given magnets of sufficient width and size, the position of each carrier (equipped with a lens) holding the magnet can be detected with a certain level of accuracy using the signals from the Hall sensors or carrying out operation on these signals. Such an arrangement, however, entails inflated dimensions in weight and size of the moving bodies, making it incompatible with the set-up of a mobile terminal, whose very purpose is directed toward compactness while at the same time critically impairing power efficiency.

SUMMARY

The present disclosure has been contemplated to solve the aforementioned problems in the context mentioned above. It is a technical goal of the present invention to provide an actuator for camera capable of using cameras whose size is relatively not large so as to achieve higher efficiency in actuator space utilization as well as in power consumption through improvement in arrangement for magnets and coils and in structures associated with their arrangement.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

To achieve the technical goals mentioned above, in one aspect of the present disclosure is provided an actuator for camera including a carrier having a lens attached thereto and movable along an optical axis: a housing enclosing the carrier; at least one magnet mounted on the carrier and having k magnetic poles (k is a natural number equal to or larger than one): a plurality of coils facing the magnet and disposed anterior or posterior along the optical axis: a Hall sensor assembly having m Hall sensors (m is a natural number equal to or larger than three) disposed anterior or posterior along the optical axis in which two consecutive Hall sensors are kept apart from each other by a first spacing; and an operational driver controlling the current to be applied to the plurality of coils in response to the signals from the Hall sensor assembly, in which the length of the magnetic pole is not less than the first spacing but not more than twice the first spacing.

In an embodiment, the at least one magnet may include a first magnet mounted on the carrier on one side thereof and a second magnet mounted on the carrier at a position symmetric with respect to the first magnet.

Furthermore, the plurality of coils may include at least one first coil facing the first magnet and fitted on one side of the housing and at least one second coil facing the second magnet and fitted on the housing at a position symmetric with respect to the first coil.

In such case, the first and second coils are preferably disposed along the optical axis in an alternating order. More preferably, the first coil (the second coil) is disposed to partially overlap the second coil (the first coil) where the second coil (the first coil) is located along the optical axis either anterior or posterior to the first coil (the second coil).

In a further embodiment, the Hall sensor assembly may include a first Hall sensor unit mounted on a first circuit board where the first coil is equipped to the first circuit board and a second Hall sensor unit mounted on a second circuit board where the second coil is equipped to the second circuit board, in which the first and second Hall sensor units are so distributed as to alternate along the optical axis.

Depending on the embodiment, the first or second Hall sensor unit may be composed of a plurality of individual Hall sensors.

According to a preferred embodiment of the present disclosure, precise detection of carrier position over the extended or expanded stroke becomes possible using only magnets with relatively small size and weight to afford improvements in power efficiency in driving zoom or auto-focusing functions.

According to another embodiment of the present disclosure, promotion in driving efficiency as well as simultaneous improvements in space utilization can be attained by providing two different magnets and placing on each side of the housing a plurality of coils that face the magnets in an asymmetric arrangement in which the coils either alternate or partially overlap.

According to another embodiment of the present disclosure, configuring plural coils and Hall sensors along the optical axis allows individual coils to be controlled independently. Furthermore, such configuration in turn provides a simpler means for processing temporal and continuous feedback control of the plural coils, leading to improvements in driving precision and temporal response properties.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 5 illustrates the arrangement of magnet and coil in accordance with an embodiment of the present invention depicted in FIG. 3.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
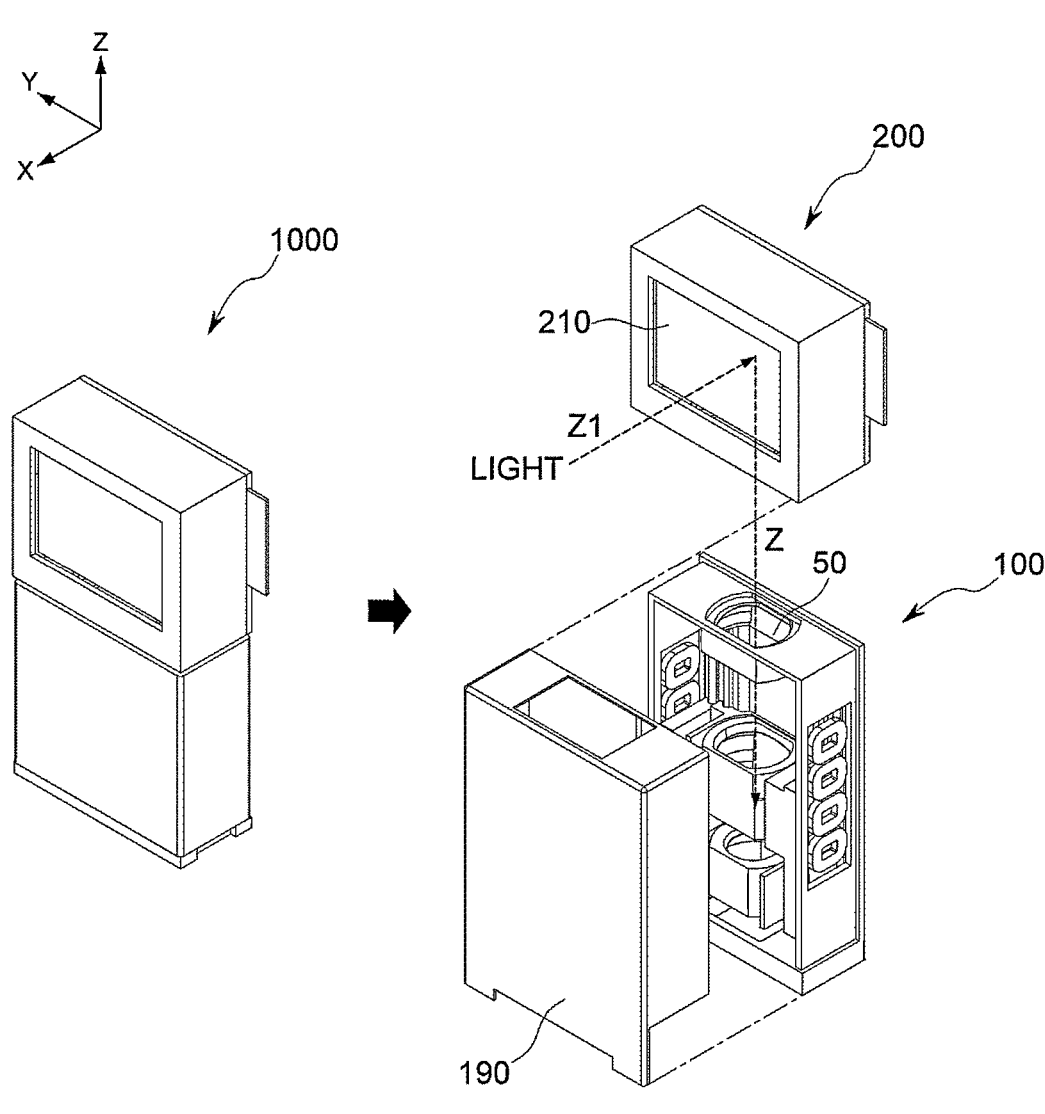
FIG. 1 depicts the overall configuration of an actuator for camera and a camera module in accordance with a preferred embodiment of the present invention.

FIG. 1 depicts the overall configuration of an actuator for camera (hereinafter referred to simply as "actuator") (100) and a camera module (1000) in accordance with a preferred embodiment of the present invention.

Needless to say, the actuator (100) of the present invention can be embodied as a single stand-alone device or as part of a camera module (1000) along with such other parts as a reflectometer module (200) as illustrated in FIG. 1.

As will be described in detail below, the actuator (100) of the present invention is for carrying out autofocusing or zooming by moving in a linear motion along an optical axis a single carrier or each of a plurality of carriers to which a lens (lens assembly) is attached.

The reflectometer module (200), which can be set up anterior to (along the optical axis) the actuator (100) of the present invention, reflects or refracts the optical path (Z1) of the object in the direction of the lens (Z). The light thus reflected or refracted towards the optical axis passes the lens (lens assembly) attached to the carrier and enters an image sensor such as complementary metal oxide semiconductor (CMOS) and charge coupled device (CCD).

The reflectometer module (200) for modifying the optical path may include a reflectometer (210) that can be selected out of a mirror, a prism or a combination of both. The reflectometer (210) may include any material capable of modifying the path of the incoming light from the outside toward the optical axis, but for the purpose of high performance optical properties, glass is the preferred medium.

The camera module (1000) of the present invention including the reflectometer module (200) and the like is configured to refract the path of light toward the lens. This allows the entire device to be set up lengthwise along the mobile terminal instead of across the width so as to keep the mobile terminal thin, making it optimal for miniaturization and slimming of mobile terminals.

In certain embodiments, the reflectometer (210) is configured to move in a rotational motion by the action of a driving means capable of generating magnetic force such as magnets and coils. Thus, as the reflectometer (210) traverses or moves in a rotational motion, the light from the object reflected (refracted) by the reflectometer (210) is led along the ±Y-axis and/or ±X-axis to enter the lens and the image sensor (30), thereby enabling corrections to camera shake along the X-axis and/or Y-axis.

The light from the object thus reflected by the reflectometer module (200) enters into the first lens (60) and second lens (70) equipped within the actuator (100), and functions such as zooming and autofocusing are performed by the actuator (100) of the present invention by making combinatorial adjustments to the position of each of the first (60) and second (70) lenses along the optical axis.

In certain embodiments, a fixed lens (50) can be set up anterior to the actuator (100) as illustrated in FIG. 1 to enhance optical performances such as actuator (100) zoom ratio.

As described hereinafter, the optical axis (Z-axis) is defined as the axis corresponding to the path of the incoming light, e.g., into the first lens (60) and the two axes spanning a plane perpendicular to the optical axis (Z-axis) are defined as the X-axis and Y-axis.

Figure 2:
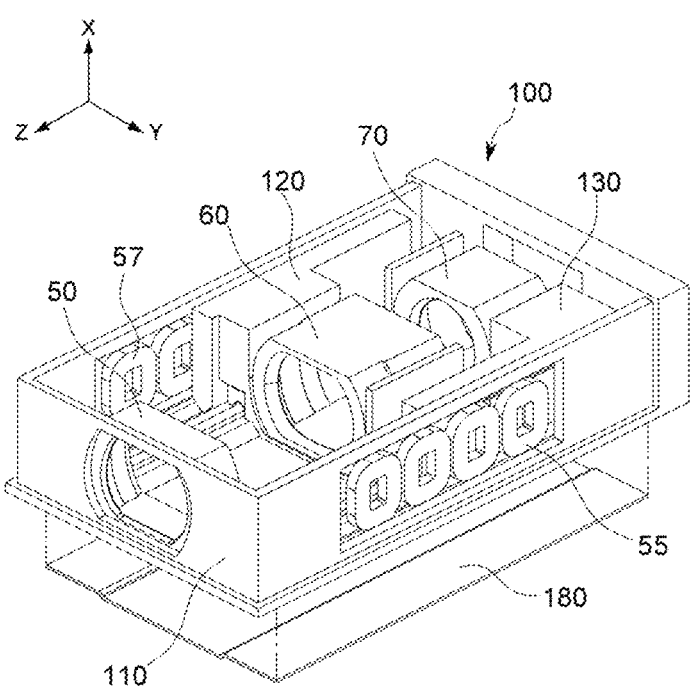
FIG. 2 illustrates the overall configuration of an actuator for camera in accordance with a preferred embodiment of the present invention.

FIG. 2 illustrates the overall configuration of an actuator (100) in accordance with a preferred embodiment of the present invention.

As illustrated in FIG. 1 and FIG. 2, the actuator (100) of the present invention includes a housing (110), which amounts to the base frame accommodating the inner parts, a casing (190) attached to the housing (110) and capable of functioning as a shield can, a first carrier (120) and a second carrier (130).

Each of the first carrier (120) with a first lens (60) attached thereto and the second carrier (130) with a second lens (70)

attached thereto amounts to a moving body in linear motion along the optical axis (Z-axis), while correspondingly the housing (110) amounts to a fixed body.

In the embodiment illustrated in FIG. 2 and the like, the second carrier (130) is placed posterior to the first carrier (120) along the optical axis and it maintains such arrangement when moving in a linear motion along the optical axis.

As will be described below, the first carrier (120) mounts a magnet (not illustrated) and on the housing (110) is fitted a first coil unit (57) that faces and imparts driving force to the magnet.

When control by an operating driver applies power of appropriate magnitude and direction to the first coil unit (57), it generates electromagnetic force between the first coil unit (57) and the magnet, and the electromagnetic force generated moves the first carrier (120) back and forth along the optical axis.

Similarly, once an operating driver exerts control to apply power of appropriate magnitude and direction to a second coil unit (55), electromagnetic force generated between the second coil unit (55) and a magnet (not illustrated) mounted on the second carrier (130) moves the second carrier (130) linearly along the optical axis.

Although the accompanying figures illustrate a first carrier (120) to which a first lens (60) is attached and a second carrier (130) to which a second lens (70) is attached, this is only one of the possible examples. Needless to say, embodiments in which further numbers of lenses and carriers are included are encompassed as well as those embodiments in which the actuator is implemented with a single lens and a single carrier.

Thus, as each of the first carrier (120) and the second carrier (130) moves linearly along the optical axis, so does each lens attached to each carrier along the optical axis, and through the positional relationship between these lenses, zooming or auto-focusing is implemented.

Furthermore, balls (not illustrated) are preferably placed between the first carrier (120) and the housing (110) as well as between the second carrier (130) and the housing (110) in order to set the first (120) and/or the second (130) carriers in smooth linear motion with the least friction.

When balls are placed as mentioned above, a yoke plate (180) may be equipped as illustrated in FIG. 2 to fortify the physical durability of the housing (110) and to tighten contact between the carriers and the balls by inducing attractive force through the action of the magnet(s) mounted on the first (120) and/or second (130) carrier.

Figure 3:
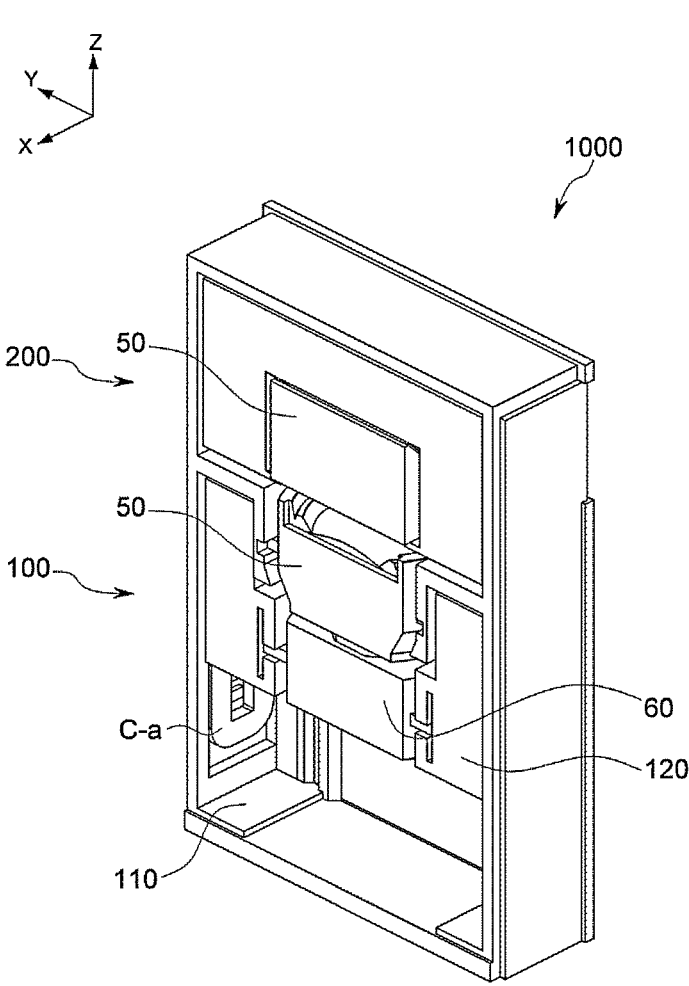
FIG. 3 illustrates the overall configuration of an actuator for camera in accordance with another embodiment of the present invention.
Figure 4:
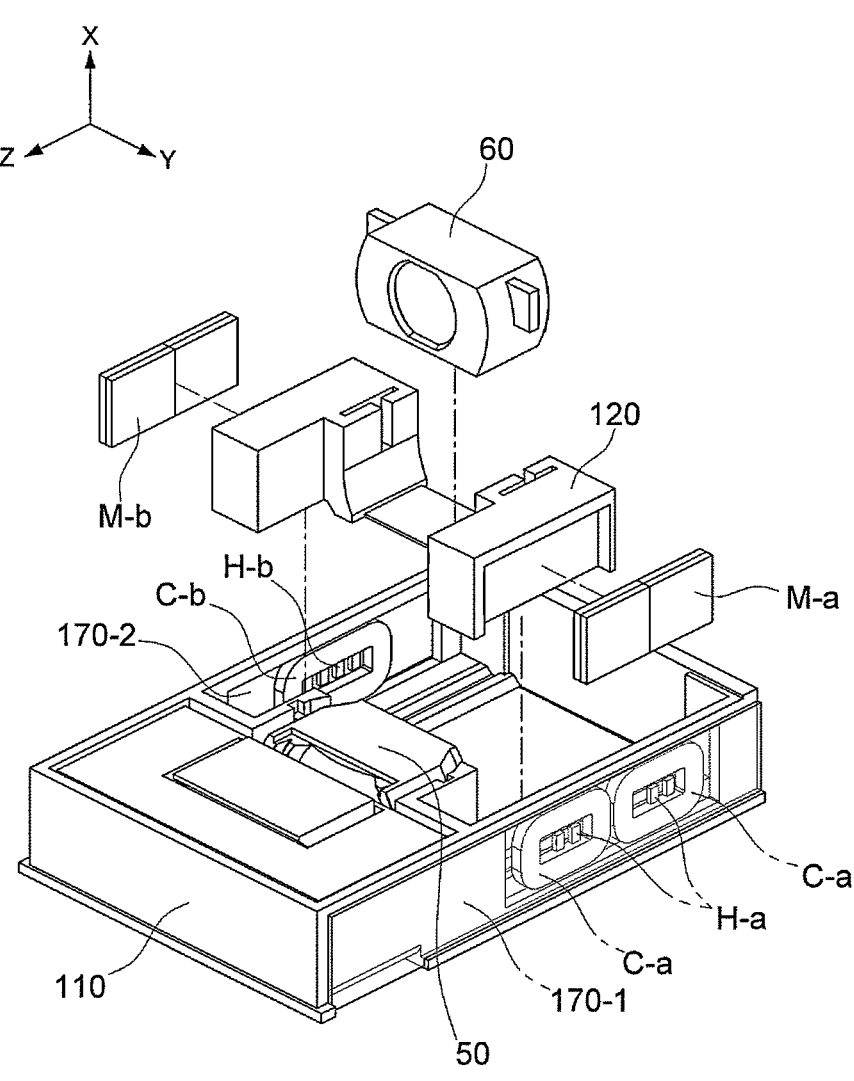
FIG. 4 illustrates the configuration in detail of the actuator for camera depicted in FIG. 3.

FIG. 3 illustrates the overall configuration of an actuator for camera in accordance with another embodiment of the present invention and FIG. 4 illustrates the configuration in detail of the actuator for camera depicted in FIG. 3.

FIG. 3 shows another embodiment of an actuator (100) described with reference to FIG. 1 and FIG. 2 in which there is only a single body in linear motion along the optical axis as illustrated in the drawing.

The technical idea of the present invention hereinafter described with reference to FIG. 3 and other drawings relates to detailed technical content for causing a moving body to move along an optical axis, but is by no means limited to a specific number of moving bodies and, needless to say, such modified designs involving plural moving bodies as explained above with reference to FIG. 1 and FIG. 2 are encompassed as well.

Also needless to say, the camera module (1000) illustrated in FIG. 3 in accordance with another embodiment of the present invention may include a reflectometer module (200)

placed anterior to it and an actuator (100) placed posterior to the reflectometer module (20) along the optical axis.

The actuator (100) of the present invention described with reference to FIG. 3 and other drawings can be embodied as a single stand-alone device or as part of a camera module (1000) as illustrated in FIG. 3, as has been well pointed out before.

Hereinafter, the technical idea of the present invention will be described with reference to an embodiment including a single moving body, such that the first carrier (120) described with reference to FIG. 1 and FIG. 2 shall be designated simply as the carrier (120) and the first lens assembly (6) shall be simply designated as the lens (60).

The actuator (100) of the present invention includes a carrier (120) having a lens (60) attached thereto and movable along an optical axis, a housing (110) enclosing the carrier (120) and in certain embodiments, may further include a fixed lens assembly (50).

On either side of the carrier (120), a first magnet (M-a) or a second magnet (M-b) for generating the driving force the carrier (120), may be mounted respectively, and on the housing (110) are fitted a first coil (C-a) and a second coil (C-b) that face respectively, the first (M-a) and second magnet (M-b).

When each of the magnets (M-a, M-b) is placed symmetrically and/or on either side of the carrier (120) as described, sufficient level of driving force is attainable without the use of a magnet that runs lengthy along the optical axis.

Moreover, such configuration can also improve general driving characteristics since it allows spreading out of the driving force generated from the coils and affords designs that better balance the center of gravity.

Each of the first (M-a) and second (M-b) magnets has k (k is a natural number not less than 1) magnetic poles (north and south) exposed towards the coils that face the magnet itself whereas the plurality of coils (C-a, C-b) are placed on different sides running parallel along the optical axis.

Placement of the plurality of coils on both sides of the housing (110) is preferably done, as illustrated in FIG. 4 and other drawings, by allocating part of the plurality of coils (C-a, C-b) on one side of the housing (110) and the rest on the other side of the housing (110) in an alternating manner, such as a zigzag array, so as to form an unsymmetrical arrangement.

As an embodiment as described above, FIG. 4 illustrates a configuration including first coils (C-a) consisting of two individual coils that face the first magnet (M-a) and a second coil (C-b) consisting of a single individual coil facing the second magnet (M-b). This, however, is merely an example and other embodiments of the actuator (100) including the first (C-a) and second (C-b) coils in numbers different than this particular embodiment are by all means encompassed by the present invention.

When the first (C-a) and second (C-b) coils are placed along the optical axis in alternating order as mentioned above, higher efficiency in space utilization for the actuator (100) is attainable compared to those embodiments in which all the coils are placed on the same side.

In such embodiments where each first coil (C-a) is disposed to alternate along the optical axis with a second coil (C-b), it is preferred that each first coil (C-a) partially overlaps a second coil (C-b) that is present in a location either anterior or posterior to the first coil (C-a) along the optical axis.

Similarly, each second coil (C-b) partially overlaps a first coil (C-a) that is present in a location either anterior or posterior to the second coil (C-b) along the optical axis.

Configuring the coils as described above enhances not only the spatial utilization but also position detection by Hall sensors as well as efficient driving control for linear movement.

The Hall sensor assembly (H-a, H-b) of the present invention includes m Hall sensors (m is a natural number not smaller than 3) disposed along the optical axis separated from one another by a first spacing. For efficient position detection, the Hall sensor assembly (H-a, H-b) is preferably spread out on both sides of the housing (110) so that the first (M-a) and second (M-b) magnets are detected in an alternating order as illustrated in FIG. 4 and other drawings. Alternatively, in certain embodiments, the Hall sensor assembly is set up on the same side.

With reference to the embodiments illustrated in the drawings, the Hall sensor assembly of the present invention includes a first Hall sensor unit (H-a) located at a position corresponding to the first coil (C-a) and a second Hall sensor unit (H-b) located at a position corresponding to the second coil (C-b). These Hall sensor units (H-a, H-b) are preferably disposed along the optical axis in an alternating order as described above for the coils.

The operational driver of the present invention controls the current to be applied to the plurality of coils in response to the signals from the Hall sensor assembly.

The operational driver can be embodied as a single stand-alone device or a circuit element or alternatively it can be embodied as an integrated chip with Hall sensors through such means as system-on-chip (SOC), or can even be provided externally depending on embodiments. Accordingly, no illustration for it is provided in the drawings.

A group of elements including the first coil (C-a) and the first Hall sensor unit (H-a) is mounted on a first circuit board (170-1), which is in electrical interface to accompanying elements such as an external module, power supply and external device. Another group of elements including the second coil (C-b) and the second Hall sensor unit (H-b) is mounted on a second circuit board (170-2).

Needless to say, the first circuit board (170-1) and the second circuit board (170-2) can be structurally worked, e.g., through bending or folding to form a single circuit board depending on the embodiment.

These circuit boards (170-1, 170-2) are preferably formed to have parts exposed to the outside to facilitate interfacing with an external module, a power supply, an external device, etc.

Figure 5:
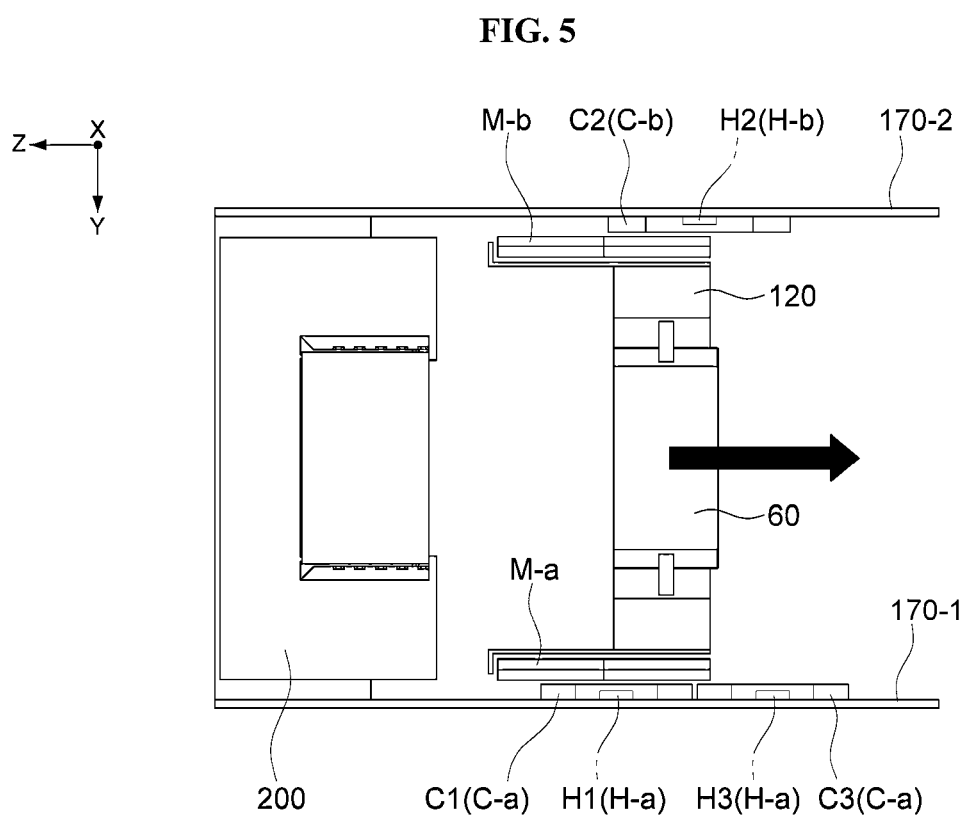
Figure 6:
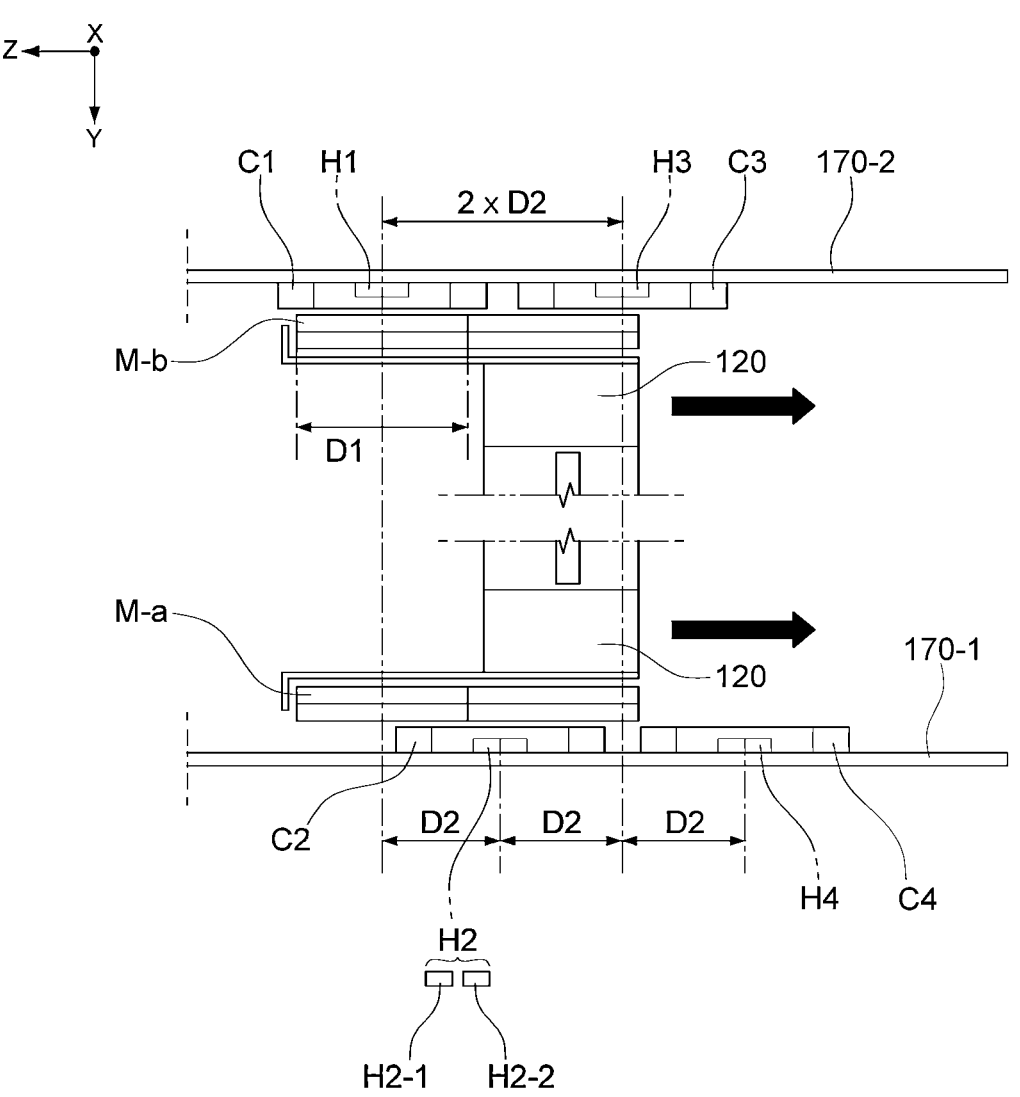
FIG. 6 illustrates the arrangement of magnet and coil in accordance with another preferred embodiment of the present invention.

FIG. 5 is a diagram depicting the arrangement of such elements as coils and magnets according to an embodiment of the present invention. FIG. 6 depicts the arrangement of such elements as coils and magnets according to another embodiment of the present invention.

With reference to the optical axis, FIG. 5 and FIG. 6 illustrate the configuration in which the coils, Hall sensor assembly and magnets are disposed in respect of one another. For the purpose of efficiency in description, the reference numerals for the coils, Hall sensor assembly and magnets will be assigned in an increasing order going from the anterior to the posterior along the optical axis.

For instance, the coils will be marked, going from the anterior to the posterior along the optical axis, as C1, C2 and C3, and for the Hall sensor assembly, H1 will be the sensor at the anteriormost position, followed by H2 with H3 being the Hall sensor at the posteriormost position.

As illustrated in FIG. 5 and other drawings, C1 and C3 are first coils (C-a), i.e., they are the coils that face the first magnets (M-a). C2 is a second coil facing the second magnet (M-b).

The embodiment shown in FIG. 6, differs from that shown in FIG. 5 only in terms of the number of coils included and matches the corresponding elements as included in the embodiment for FIG. 5.

As illustrated in FIG. 6, the length (along the optical axis) of the magnetic poles for the magnet mounted on the carrier (120), for example, the first magnet (M-a) and the second magnet (M-b), is equal to or larger than the spacing (D2) (hereinafter designated as "the first spacing") between the Hall sensors (H1, H2, H3, H4) arranged in order along the optical axis of the Hall sensor assembly, while at the same time equal to or smaller than the distance that amounts to twice the first spacing.

Setting the length of the magnetic poles as described above enables continuous detection of positions since for each position of the magnet (the first magnet (M-a) or the second magnet (M-b)) defined along the optical axis, a particular Hall sensor of the assembly (H1, H2, H3, H4) can be guided to face the magnet.

This continuous position detection made available means that the particular coil against which controlled current will be applied can be exactly defined out of the plural coils (C1, C2, C3, C4) using the detection signals from the Hall sensor assembly tasked with detection for the position in question, affording improved efficiency in processing for driving control as well.

In addition, the aforementioned position detection and control processing can still be implemented effectively even when the length of the magnetic pole is not larger than twice the first spacing, opening up for use magnets with commensurate reductions in weight or size, which in turn contributes to further improvements in power efficiency of the actuator (100).

For the purpose of more effective continuous position detection and continuous driving control, the second (going down from the anterior along the optical axis) coil (C2) is preferably placed posterior (lower) to the first coil (C1) along the optical axis at such location that part of C2 (anterior region) overlaps part of C1 (posterior region).

In correspondence, the coil (C4) set up most posteriorly in FIG. 6 is placed at such location that C4 partially (anterior region) overlaps part of the third coil (posterior region) (C3).

Thus, the actuator (100) of the present invention can not only precisely detect the position of the carrier (120) regardless of its location within the stroke range, but also accurately define the coil to which current will be applied, affording simultaneous improvements in precision in driving control for such functions as driving for zoom and autofocusing.

As illustrated in FIG. 6, the first Hall sensor unit (H-a) or the second Hall sensor unit (H-b) can consist of plural individual Hall sensors (H2-1, H2-2). Since such configuration enables carrying out operations on plural signal systems for a given position, even more precise detection of positions becomes available.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator for camera comprising:

a carrier having a lens attached thereto and movable along an optical axis;

a housing enclosing the carrier;

at least one magnet mounted on the carrier and having k magnetic poles where k is a natural number equal to or larger than one;

a plurality of coils facing the magnet and disposed anterior or posterior along the optical axis;

a Hall sensor assembly having m Hall sensors, where m is a natural number equal to or larger than three, disposed anterior or posterior along the optical axis, each of the m Hall sensors being separated from one another by a first spacing; and an operational driver configured for controlling the current to be applied to the plurality of coils in response to the signals from the Hall sensor assembly, and wherein the length of the magnetic pole being not less than the first spacing but not more than twice the first spacing and wherein the at least one magnet comprises a first magnet mounted on the carrier on one side thereof; and a second magnet mounted on the carrier at a position symmetric with respect to the first magnet; and wherein the plurality of coils comprises at least one first coil facing the first magnet and fitted on one side of the housing; and at least one second coil facing the second magnet and fitted on the housing at a position symmetric with respect to the first coil and wherein the first and second coils are disposed along the optical axis in an alternating order and the first coil is disposed to partially overlap the second coil, the second coil being located along the optical axis either anterior or posterior to the first coil.

2. The actuator according to claim 1, wherein the Hall sensor assembly comprises:

a first Hall sensor unit mounted on a first circuit board, said first circuit board being equipped with the first coil; and a second Hall sensor unit mounted on a second circuit board, said second circuit board being equipped with the second coil.

3. The actuator according to claim 2, wherein the first and second Hall sensor units are disposed along the optical axis in an alternating order.

4. The actuator according to claim 2, wherein the first or second Hall sensor unit is composed of a plurality of Hall sensors.

* * * * *